(12) United States Patent
Satou et al.

(10) Patent No.: US 8,191,697 B2
(45) Date of Patent: Jun. 5, 2012

(54) SPRING CLUTCH MECHANISM IN SCREW DRIVER

(75) Inventors: Shinichirou Satou, Hitachinaka (JP);
Hideki Yamada, Hitachinaka (JP);
Tsukasa Suzuura, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 432 days.

(21) Appl. No.: 12/472,418

(22) Filed: May 27, 2009

(65) Prior Publication Data

US 2009/0293653 A1    Dec. 3, 2009

(30) Foreign Application Priority Data

May 27, 2008 (JP) ................ P2008-138432
May 27, 2008 (JP) ................ P2008-138433

(51) Int. Cl.
*F16D 47/04* (2006.01)
*F16D 41/20* (2006.01)
*B25B 21/00* (2006.01)

(52) U.S. Cl. .......... 192/48.3; 192/34; 192/41 S; 173/13; 173/217

(58) Field of Classification Search ............ 192/34, 192/41 S, 48.3; 173/13
See application file for complete search history.

(56) References Cited

U.S. PATENT DOCUMENTS

| | | | |
|---|---|---|---|
| 5,139,093 A | 8/1992 | Lyon | |
| 5,318,161 A | 6/1994 | Lyga | |
| 5,673,758 A * | 10/1997 | Sasaki et al. | 173/178 |
| 5,735,183 A * | 4/1998 | Sasaki et al. | 81/473 |

FOREIGN PATENT DOCUMENTS

| | | |
|---|---|---|
| EP | 0 678 685 A1 | 10/1995 |
| EP | 0 724 934 A1 | 8/1996 |
| FR | 551 506 | 4/1923 |
| JP | 4-96630 U | 8/1992 |
| JP | 04-277330 A | 10/1992 |
| JP | 8-74889 A | 3/1996 |
| JP | 8-74891 A | 3/1996 |
| JP | 10-96436 A | 4/1998 |
| JP | 2008-89130 A | 4/2008 |
| WO | WO 03/087611 A1 | 10/2003 |

OTHER PUBLICATIONS

Japanese Office Action mailed Mar. 1, 2012 for Application No. 2008-138432, 3 pages including Translation.
Japanese Office Action mailed Mar. 1, 2012 for Application No. 2008-138433, 3 pages including Translation.

* cited by examiner

*Primary Examiner* — Richard M. Lorence
(74) *Attorney, Agent, or Firm* — Antonelli, Terry, Stout & Kraus, LLP.

(57) ABSTRACT

A spring clutch mechanism for transmitting a driving force of a driving part to a driven part, including a first part, a second part, and a spring disposed between the first part and the second part. The first part is connected to the driven part. The second part is connected to the driving part and is rotatable relative to the first part coaxially therewith. The first part has a first end provided with a frusto-conical portion having a first tapered surface, and the second part has a second end formed with a recess provided with a second tapered surface in contact with the first tapered surface. the first part and the second part are aligned linearly and coaxially in a state that the first end is inserted into the second end maintaining contact of the first tapered surface with the second tapered surface.

5 Claims, 6 Drawing Sheets

REAR ← → FRONT

REAR ←→ FRONT

US 8,191,697 B2

SPRING CLUTCH MECHANISM IN SCREW DRIVER

CROSS REFERENCE TO RELATED APPLICATION

This application claims priority from Japanese Patent Application Nos. 2008-138432 filed May 27, 2008 and 2008-138433 filed May 27, 2008. The entire content of the priority applications are incorporated herein by reference.

TECHNICAL FIELD

The present invention relates to a spring clutch mechanism particularly available for a screw driver.

BACKGROUND

A spring clutch mechanism includes an internal drive member, an external driven member, and a coil spring acting on the drive member and the driven member. The drive member extends through an interior of the driven member. The coil spring has one end portion fixed to the driven member, and another end portion spirally wound over the drive member. The rotation of the drive member causes decrease in inner diameter of the coil spring to drivingly connect the drive member and the driven member through the coil spring. Such arrangement is described in Japanese Patent Application Publication No. H08-74889.

According to the disclosed spring clutch mechanism, coaxial arrangement between the drive member and the driven member may not be maintained particularly in case of high speed rotation of the drive member, thereby making impossible to realize the high speed rotation. Further, the coil spring may be disengaged from the drive member due to vibration imparted on a power tool such as a screw driver.

SUMMARY

It is therefore an object of the present invention to provide a spring clutch mechanism capable of performing high speed rotation and capable of preventing the coil spring from being disengaged from the drive member.

This, and other objects of the present invention will be attained by providing a spring clutch mechanism for transmitting a driving force of a driving part to a driven part, the spring clutch mechanism including a first part, a second part, and a spring. The first part is connected to the driven part. The second part is connected to the driving part and is rotatable relative to the first part coaxially therewith. One of the first part and the second part has a first end provided with a frusto-conical portion having a first tapered surface, and remaining one of the first part and the second part has a second end formed with a recess provided with a second tapered surface in contact with the first tapered surface. The first part and the second part are aligned linearly and coaxially in a state that the first end is inserted into the second end maintaining contact of the first tapered surface with the second tapered surface. The spring is disposed between the first part and the second part for allowing the second part to rotate only in one direction with respect to the first part.

Preferably, the first end and the second end are made from a metal.

Preferably, the spring is a coil spring having one end and another end and, the first part has a first spring mount portion formed with a first seat groove in which the one end of the coil spring is seated, and the second part has a second spring mount portion formed with a second seat groove in which the another end of the coil spring is seated. In this structure, a first annular groove is formed at an outer peripheral surface of the first spring mount portion, and the second seat groove is a second annular groove formed at an outer peripheral surface of the second spring mount portion.

Preferably, the coil spring is made from steel.

In another aspect of the invention, there is provided a spring clutch mechanism for transmitting a driving force of a driving part to a driven part, the spring clutch mechanism including a first part, a second part and a coil spring. The first part is connected to the driven part and has a first spring mount portion formed with a first seat groove. The second part is connected to the driving part and is rotatable relative to the first part coaxially therewith. The second part has a second spring mount portion formed with a second seat groove. The coil spring is disposed between the first part and the second part for allowing the second part to rotate only in one direction with respect to the first part. The coil spring has one end portion seated in the first seat groove, and another end portion seated in the second seat groove.

Preferably, the first seat groove is a first annular groove formed at an outer peripheral surface of the first spring mount portion, and, the second seat groove is a second annular groove formed at an outer peripheral surface of the second spring mount portion. and preferably, the coil spring is made from steel.

DETAILED DESCRIPTION

Figure 1:
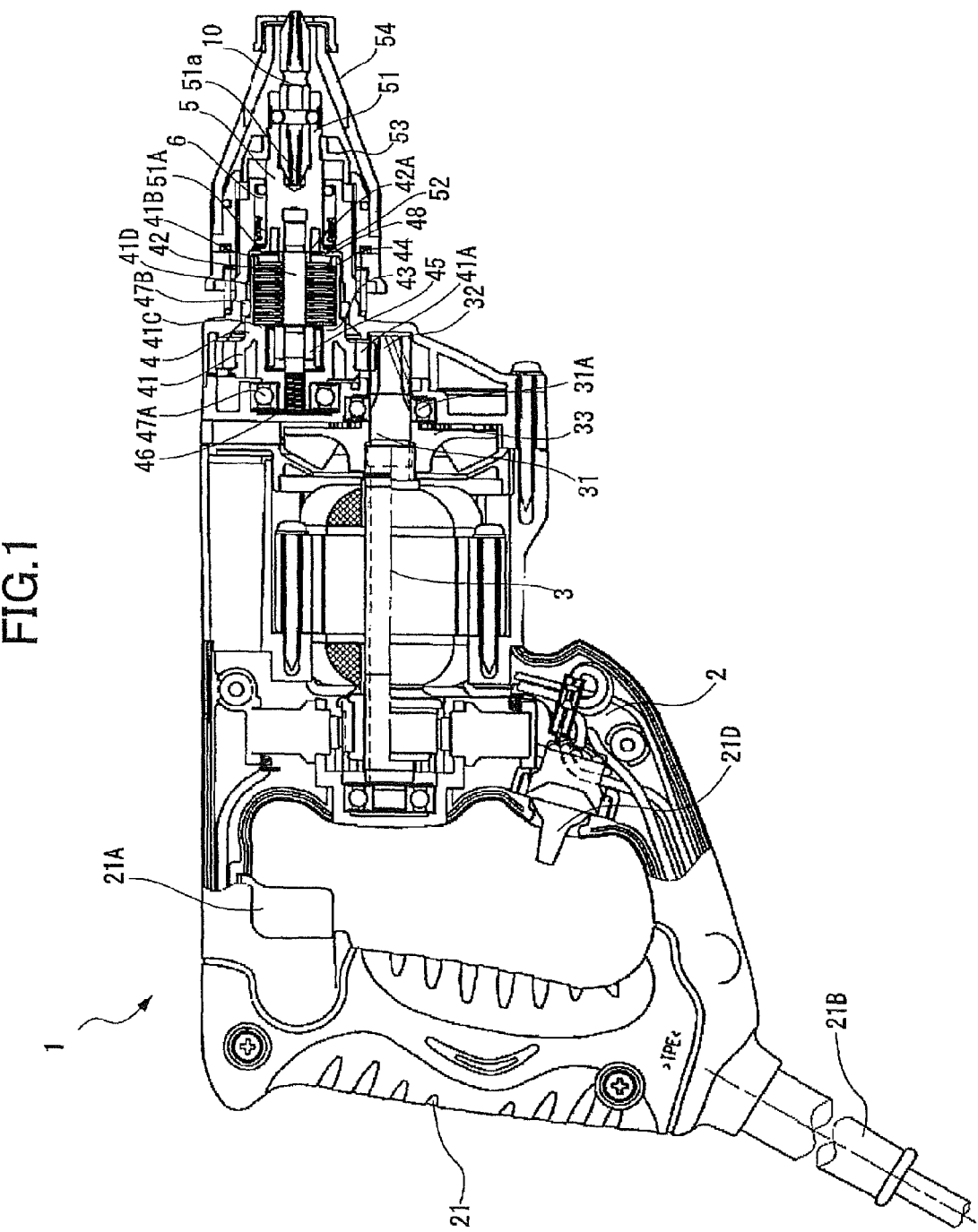
FIG. 1 is a cross-sectional view of a screw driver according to one embodiment of the present invention.

A screw driver according to one embodiment of the present invention will be described with reference to FIGS. 1 through 13. As shown in FIG. 1, the screw driver 1 includes a housing 2, a motor 3, a clutch portion 4, an end bit mounting portion 5, and a spring clutch mechanism 6. An end bit 10 is detachably attached to the end bit mounting portion 5.

The housing 2 functions as an outer frame, and has a rear portion provided with a handle 21 functioning as a grip portion. In the following description, end bit side will be referred to as a front side, and a handle side will be referred to as a rear side. The handle 21 is provided with a trigger 21A and a switch 21D. The trigger 21A is adapted to perform drive control to the motor 3, and the switch 21D is adapted to change rotational direction of the motor 3 between normal (forward) and reverse directions. A power cord 21B extends from the handle 21. The power cord 21B is electrically connected to an external power source (not shown).

The motor 3 is positioned in the housing 2 at a front side of the handle 21, and has a rotation shaft 31 extending in frontward/rearward direction. The rotation shaft 31 is rotatably supported to the housing 2 through a bearing 31A and has a front end fixedly provided with a pinion 32 and a base end fixedly provided with a fan 33. In the following description, screw fastening direction will be referred to as a forward rotational direction, and screw unfastening direction will be referred to as reverse rotational direction of the rotation shaft 31 about its axis.

Figure 2:
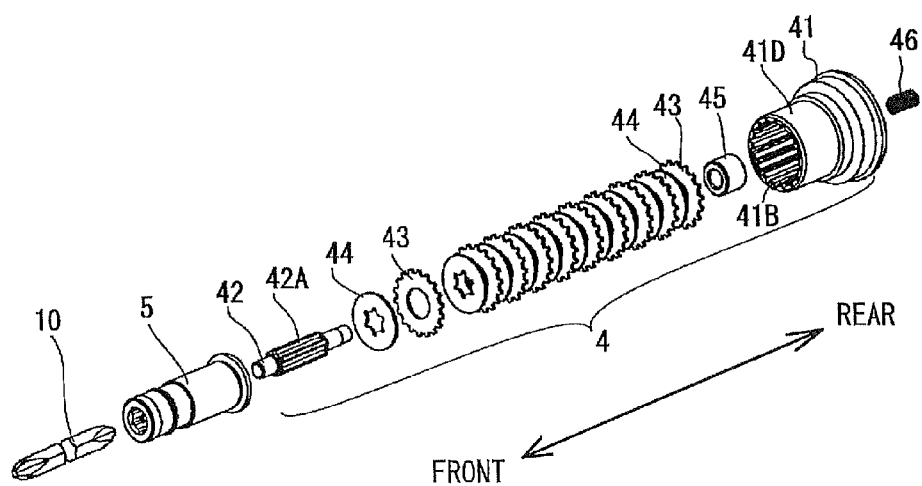
FIG. 2 is an exploded perspective view of a clutch drum in the screw driver according to the embodiment.
Figure 3:
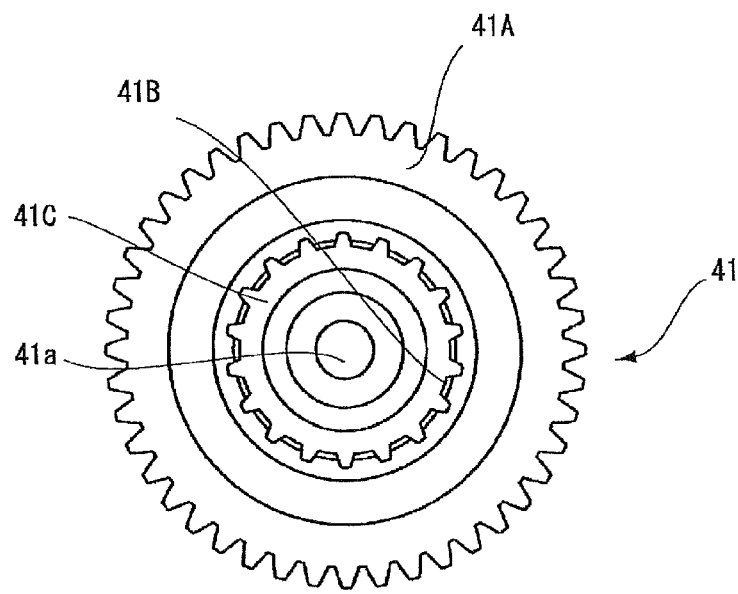
FIG. 3 is a front view of the clutch drum in the screw driver according to the embodiment.
Figure 4:
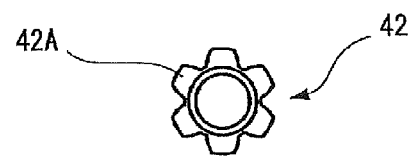
FIG. 4 is a cross-sectional view of a spline shaft in the screw driver according to the embodiment.

As shown in FIG. 2, the clutch portion 4 generally includes a clutch drum 41, a spline shaft 42, ten pieces of first clutch plates 43 serving as driving members, ten pieces of second clutch plates 44 serving as driven members, and a one-way clutch 45. The clutch drum 41 has a front portion provided with an accommodation portion 41D rotatably supported to the housing 2 through a bearing 47B, and a rear portion rotatably supported to the housing 2 through a bearing 47A. The accommodation portion 41D is of a cylindrical configuration in which the first and second clutch plates 43 and 44 are accommodated. The accommodation portion 41D defines a rotation axis about which the clutch drum 41 is rotatable. As shown in FIGS. 1 and 3, the accommodation portion 41D has a rear side provided with a gear 41A meshedly engaged with the pinion 32. As shown in FIGS. 2 and 3, the accommodation portion 41D has an inner peripheral surface provided with a plurality of convex sections 41B extending in the axial direction of the accommodation portion 41D and spaced away from each other with a constant pitch in a circumferential direction thereof.

A stop wall portion 41C is provided in the accommodation portion 41D at each rear end of the convex sections 41B. Further, a sleeve section is provided at a rear side of the stop wall portion 41C for accommodating therein the one-way clutch 45. Further, the clutch drum 41 has a rear portion rearward of the sleeve section. The rear portion is formed with a hole 41a (FIG. 3) in which a spring 46 (FIGS. 1 and 2) is disposed.

The spline shaft 42 is coaxial with the end bit mounting portion 5 and is rotatable integrally therewith. As shown in FIG. 1, the spline shaft 42 is supported by the one-way clutch 45 in the interior of the clutch drum 41, and has a rear end in abutment with the spring 46, so that the spline shaft 42 is urged frontward by the biasing force of the spring 46. The spline shaft 42 has an outer peripheral surface provided with a plurality of convex sections 42A extending in the axial direction and spaced away from each other with a constant pitch in the circumferential direction. These projections are provided at a region of the outer peripheral surface exposed to the interior of the clutch drum 41.

Figure 5:
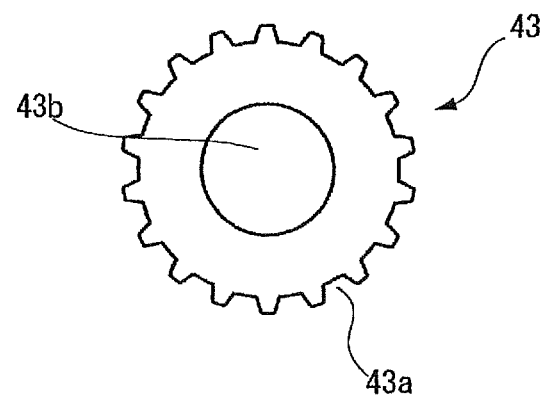
FIG. 5 is a front view of a first clutch plate in the screw driver according to the embodiment.

As shown in FIG. 5, a plurality of concave sections 43a is formed along the outer peripheral surface of each of the first clutch plates 43 for meshingly engaging the convex sections 41B of the clutch drum 41. A hole 43b is formed at a center portion of each of the first clutch plates 43 for allowing the spline shaft 42 to pass therethrough. Each of the first clutch plates 43 has a plate-like shape having a drive-side contact surface that contacts the second clutch plate 44. As shown in FIG. 1, in a state where the first clutch plates 43 are aligned and assembled within the clutch drum 41 so that the concave sections 43a are in meshing engagement with the convex sections 41B, the first clutch plates 43 are allowed to move in the axial direction relative to the clutch drum 41, but are prohibited from rotating in the circumferential direction relative to the clutch drum 41. Among the ten first clutch plates 43, the rearmost clutch plate 43 can be in contact with the stop wall portion 41C.

Figure 6:
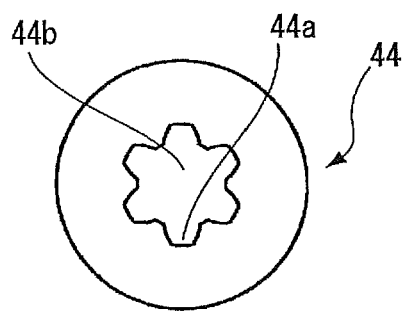
FIG. 6 is a front view of a second clutch plate in the screw driver according to the embodiment.

As shown in FIG. 6, each of the second clutch plates 44 has a circular disk shape having such a diameter that the second clutch plate 44 does not interfere with the convex sections 41B. Each of the second clutch plates 44 has a follower-side contact surface that contacts the first clutch plate 43. A hole 44b is formed in a center portion of each of the second clutch plates 44 for allowing the spline shaft 42 to extend therethrough. The hole 44b has a plurality of concave sections 44a that meshingly engages the convex sections 42A of the spline shaft 42. In a state where the second clutch plates 44 are mounted on the spline shaft 42 so that the concave sections 44a are in meshing engagement with the convex sections 42A, the second clutch plates 44 are allowed to move in the axial direction relative to the spline shaft 42, but are prohibited from rotating in the circumferential direction relative to the spline shaft 42. Among the ten second clutch plates 44, a foremost second clutch plate 44 can be in contact with a contact section 51A to be described later, which is the rear end section of the end-bit mounting portion 5.

The first clutch plates 43 and the second clutch plates 44 are arranged alternately from the position of the stop wall portion 41C toward the front side, thereby constituting a first clutch. As described above, each of the first clutch plates 43 and the second clutch plates 44 is allowed to move in the axial direction. Hence, when the foremost second clutch plate 44 contacts the rear end section of the end-bit mounting portion 5 and is urged rearward, the first clutch plates 43 and the second clutch plates 44 move rearward (transmission position), and friction is generated between the neighboring ones of the drive-side contact surface of the first clutch plate 43 and the follower-side contact surface of the second clutch plate 44. Because of the friction generated in this way, the clutch drum 41 and the spline shaft 42 rotate together (co-rotation occurs) coaxially via the first clutch plates 43 and the second clutch plates 44.

In contrast, in a state where the foremost second clutch plate 44 is not urged rearward (cutoff position), no or little friction is generated between the neighboring ones of the first clutch plate 43 and the second clutch plate 44. Hence, the co-rotation of the clutch drum 41 and the spline shaft 42 via the first clutch plates 43 and the second clutch plates 44 is suppressed. Since power transmission is performed by the frictional force through the ten first clutch plates 43 and the ten second clutch plates 44, stress such as frictional force applied to each of the first and second clutch plates 43 and 44 can be reduced, which increases service life of the clutch portion 4. Note that the rearmost first clutch plate 43 contacts the stop wall section 41C that rotates together with the first clutch plates 43, and that the foremost second clutch plate 44 contacts the contact section 51A that rotates together with the second clutch plates 44. Thus, no friction is generated between the rearmost first clutch plate 43 and the stop wall portion 41C, and no friction is generated between the foremost second clutch plate 44 and the end-bit mounting portion 5. This improves durability of the clutch drum 41 and the end-bit mounting portion 5.

The spline shaft 42 is supported indirectly by the bearing 47A (first bearing) and the spring clutch mechanism 6 to be described later, so that the first clutch plates 43 and the second clutch plates 44 are located between the bearing 47A and the spring clutch mechanism 6. Hence, even if a load or stress is imparted to the spline shaft 42 when friction is generated, occurrence of chatter and wobble can be suppressed since the both ends of the spline shaft 42 are supported.

The one-way clutch 45 is assembled in the sleeve section at the rear side of the wall section 41C and supports the rear end portion of the spline shaft 42. When the clutch drum 41 rotates in the reverse direction, the one-way clutch 45 transmits driving force to the spline shaft 42 by a transmission route different from that using the first clutch plates 43 and the second clutch plates 44. In contrast, when the clutch drum 41 rotates in the forward direction, the one-way clutch 45 is not capable of transmitting driving force to the spline shaft 42. The first clutch plates 43 and the second clutch plates 44 cannot transmit driving force in the forward or reverse direction from the clutch drum 41 to the spline shaft 42 unless frictional force is generated. On the contrary, because the one-way clutch 45 always transmits driving force from the clutch drum 41 to the spline shaft 42 when the clutch drum 41 rotates in the reverse direction, the end-bit mounting portion 5 can be rotated in the reverse direction even when no friction occurs between the first clutch plates 43 and the second clutch plates 44.

Comparing the diameters of the clutch drum 41 and the end-bit mounting portion 5, the diameter of the clutch drum 41 is larger than that of the end-bit mounting portion 5, the clutch drum 41 being at the drive side for transmitting driving force to the spline shaft 42. Hence, the housing 2 can be configured to have a small diameter at the end-bit mounting portion 5 side, thereby enabling screw driving operations at a narrow shooting spot. In addition, the inertia mass of the clutch drum 41 that rotates together with the first clutch plates 43 can be made large. Thus, when frictional force is generated between the first clutch plates 43 and the second clutch plates 44 in the transmission position, a drop in rotation speeds of the clutch drum 41 and the motor 3 connected to the clutch drum 41 can be suppressed.

As shown in FIG. 1, a first seal member 48 is provided in an opening part of the accommodating section 41D accommodating the first clutch plates 43 and the second clutch plates 44. The first seal member 48 fills a gap between the accommodating portion 41D and a socket 51 to be described later, to hermetically maintain the interior of the accommodating portion 41D (i.e., to isolate the interior of the accommodating portion 41D from outside of the accommodating portion 41D). Because the socket 51 is rotatably supported by the spring clutch mechanism 6 to be described later, grease is filled around the socket 51 for reducing rotational resistance.

If the grease enters the accommodating portion 41D and adheres to the first clutch plates 43 and the second clutch plates 44, the coefficient of friction changes so that driving force cannot be transmitted efficiently from the clutch drum 41 to the spline shaft 42 via the first clutch plates 43 and the second clutch plates 44. Thus, by providing the first seal member 48 to prevent the grease from entering the accommodating portion 41D, a change in coefficient of friction between the first clutch plates 43 and the second clutch plates 44 can be prevented for stabilizing screw driving operation.

The end-bit mounting portion 5 mainly includes the socket 51 and an engagement segment 52. The socket 51 has a front end formed with a mounting hole 51*a* into which the bit 10 is mounted, and has a rear end fitted with and connected to the spline shaft 42. The socket 51 is supported by the spring clutch mechanism 6 serving as a second bearing provided to the housing 2, so that the socket 51 can rotate in the circumferential direction and can move in the axial direction. Because the socket 51 is fitted with and partly disposed over the spline shaft 42, an overall length of the end-bit mounting portion 5 and the spline shaft 42 can be shortened, thereby reducing the overall length of the screw driver 1.

Figure 7:
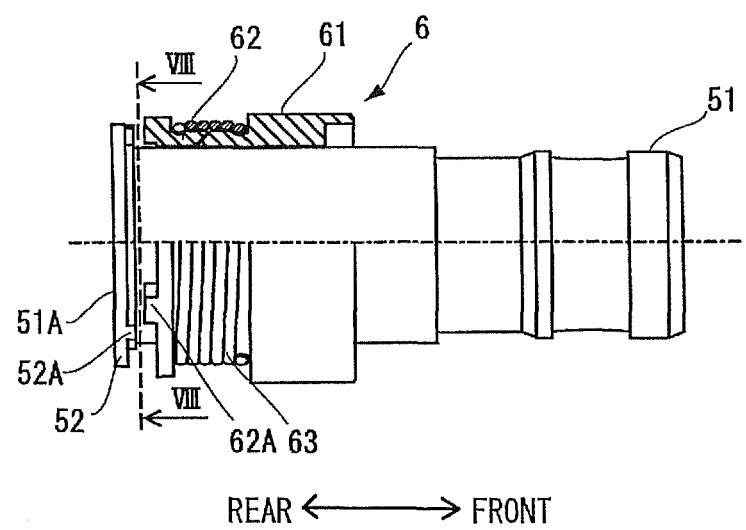
FIG. 7 is a cross-sectional view of a spring clutch mechanism and a socket portion under application of load in the screw driver according to the embodiment.
Figure 8:
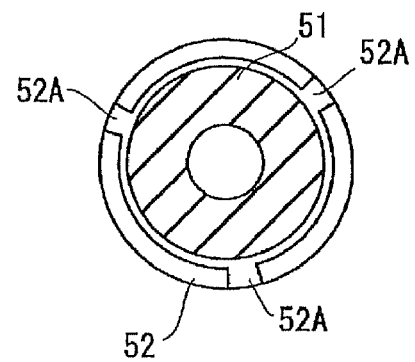
FIG. 8 is a cross-sectional view taken along the line VIII-VIII in FIG. 7.

As shown in FIGS. 1 and 7, the engagement segment 52 is provided at a rear side of the socket 51 and at a position adjacent to the connection region between the socket 51 and the spline shaft 42. The engagement segment 52 is integral with the socket 51. The engagement segment 52 has a rear end surface functioning as the contact section 51A with which the foremost second clutch plate 44 is brought into contact. The rearward movement of the end-bit mounting portion 5 causes the contact section 51A to contact the foremost second clutch plate 44, thereby pressing the second clutch plates 44 against the first clutch plates 43. As shown in FIGS. 7 and 8, the engagement segment 52 has a front side provided with three engagement pawls 52A equally spaced away from each other in the circumferential direction. The spring clutch mechanism 6 is engageable with the engagement pawls 52A.

A second seal member 53 is provided to the socket 51 at the front side of the spring clutch mechanism 6 for preventing the grease filled around the socket 51 from flowing outward. A cover 54 is provided around the socket 51 and the second seal member 53. The cover 54 is detachably attached to the housing 2, and is configured to allow a tip end portion of the end bit 10 to slightly protrude from a tip end portion of the cover 54.

When the bit 10 mounted on the front end of the end-bit mounting portion 5 contacts a screw (not shown) and is pressed rearward by the reaction force from the screw, the end-bit mounting portion 5 moves rearward and friction occurs between the first clutch plates 43 and the second clutch plates 44. However, in a state where the screw (not shown) is driven and buried in a workpiece (not shown), there is no need to drive the screw any farther. Thus, in this state, the front end section of the cover 54 contacts the workpiece (not shown) to cancel the reaction force acting on the bit 10 from the screw, thereby reducing the friction between the first clutch plates 43 and the second clutch plates 44 to cut off the transmission of the driving force to the bit 10.

Figure 9:
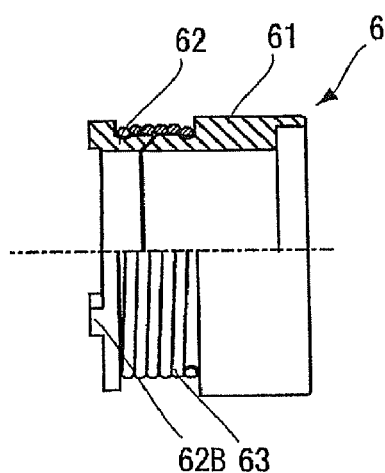
FIG. 9 is a partial cross-sectional side view of the spring clutch mechanism in the screw driver according to the embodiment.
Figure 10:
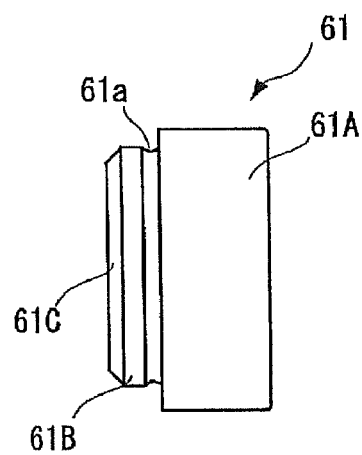
FIG. 10 is a side view of a bearing section in the spring clutch mechanism in the screw driver according to the embodiment.

As shown in FIGS. 7 and 9, the spring clutch mechanism 6 includes a bearing section (first section) 61, a seat section (second part) 62 constituting an engagement section, and a spring section 63 (forward rotation preventing section). The bearing section 61 is made from a metal having a low friction coefficient available as a material for a bearing, and has a sleeve-like configuration for slidably supporting the socket 51. As best shown in FIG. 10, the bearing section 61 includes a sleeve section 61A, a first spring mount section 61B, and an abutment section 61C. The sleeve section 61A is fixed to the housing 2 by force-fitting. Thus, the bearing section 61 is immovable and unrotatable relative to the housing 2.

The first spring mount section 61B is provided at a rear part of the sleeve section 61A, and has an outer diameter approximately equal to or greater than an inner diameter of the spring section 63. An annular groove 61a is formed at a boundary between the first spring mount section 61B and the sleeve section 61A. The annular groove 61a serves as a spring seat for positioning one end portion of the spring section 63. The abutment section 61C is the rearmost portion of the bearing section 61, and has a rearmost part configured into a frusto-conical shape.

Figure 11A:
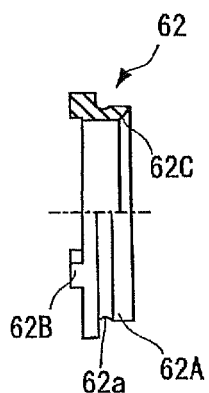
FIG. 11(a) is a partial cross-sectional side view of an engagement portion in the spring clutch mechanism in the screw driver according to the embodiment.
Figure 11B:
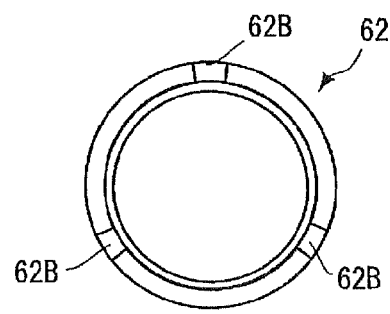
FIG. 11(b) is a bottom view of the engagement portion of FIG. 11(a)

As shown in FIGS. 11(a) and 11(b), the seat section 62 is generally cylindrical, and includes a second spring mount section 62A and an engaged section 62B. The second spring mount section 62A is the front part of the seat section 62, and has an outer diameter equal to or greater than the inner diameter of the spring section 63 similar to the first spring mount section 61B. The second spring mount section 62A has a tapered front-most inner peripheral surface 62C, which is complementary with respect to the frusto-conical surface of the abutment section 61C, so that the frusto-conical surface is abutable on the tapered inner peripheral surface 62C of the second spring mount section 62A.

A flange is provided at a rear part of the second spring mount section 62A, and the engaged section 62B protrudes rearward from the rear surface of the flange. As shown in FIG. 11(b), the engaged section 62B has three protrusions equally spaced away from each other in the circumferential direction. A second annular groove 62a is formed at a boundary between the flange and the second spring mount section 62A. The second annular groove 62a serves as a spring seat for positioning another end portion of the spring section 63.

Figure 12:
FIG. 12 is a side view of a spring in the spring clutch mechanism in the screw driver according to the embodiment.

As shown in FIG. 12, the spring section 63 is a tightly wound coil spring in which neighboring wire portions are in contact with each other. The coil spring is made from steel, and spirally winding direction of the coil spring is the forward rotational direction when spirally winding the coil spring from the first spring mount section 61B to the second spring mount section 62A in a state where the coil spring is fitted with these mounting sections 61B and 62A. Therefore, if the seat section 62 is rotated in the forward direction relative to the bearing section 61, the spring section 63 fitted with the first and second spring mount sections 61B, 62A will be rotated in the forward direction so as to reduce its inner diameter. Accordingly, friction between the spring section 63 and the first and second spring mount sections 61B, 62A will be increased, preventing the spring section 63 from further rotation in the forward direction relative to the bearing section 61. On the other hand, if the seat section 62 is rotated in the reverse direction relative to the bearing section 61, the inner diameter of the spring section 63 will be increased. Therefore, reverse rotation of the seat section 62 relative to the bearing section 61 cannot be restrained by the spring section 63.

Because of the surface contact between the frusto-conical surface of the abutment section 61C and the complementary tapered surface 62C of the seat section 62, axial alignment between the bearing section 61 and the seat section 62 can be maintained without any offsetting relationship. More specifically, because of the contact at the tapered surfaces 61C and 62C, self-centering can be performed to provide coaxial rotation of the bearing section 61 and the seat section 62, in spite of employment of only the spring section 63 for providing connection between the seat section 62 and the bearing section 61. Accordingly, the spring clutch mechanism 6 according to the embodiment is available for high speed rotation because of the linearity between the bearing section 61 and the seat section 62. Further, since the bearing section 61 and the seat section 62 are made from the low friction metal, excellent sliding movement can be realized between the tapered surface 62C and the abutment section 61C. In other words, one of the bearing section 61 and the seat section 62 can function as a bearing member for the remaining one of the bearing section 61 and the seat section 62.

Further, since the first and second annular grooves 61a, 62a are formed at the first and second spring mount sections 61B and 62A, one end and the other end of the spring section 63 can be stably seated in the annular grooves 61a, 62a, respectively. With this arrangement, disengagement of the spring section 63 from the first and second spring mount sections 61B, 62A can be avoided. This advantage is particularly effective in a case where the seat section 62 is reversely rotated at high speed relative to the bearing section 61 to increase inner diameter of the spring section 63.

When the screw driver 1 is used to drive a screw, a user aligns the end bit 10 with the head of a screw (not shown) and presses the bit 10 against the screw, and pulls the trigger 21A. The socket 51 is moved rearward relative to the spring clutch mechanism 6 as shown in FIG. 7 when the end bit 10 is pressed. In this case, the engagement pawls 52A are disengaged from the engaged section 62B of the seat section 62 as shown in FIG. 7. Therefore, rotation of the socket 51 is not restrained by the spring clutch mechanism 6, so that the socket 51 can be rotated in forward and reverse direction.

Because of the reaction force acting on the bit 10 from the screw, the socket 51 moves toward the clutch drum 41 side, the contact section 51A contacts the foremost second clutch plate 44, and friction occurs between the first clutch plates 43 and the second clutch plates 44. In this way, the clutch drum 41 and the spline shaft 42 can rotate together to transmit the output from the motor 3 in the forward direction to the socket 51 and the bit 10. At this time, the frictional force between the first clutch plates 43 and the second clutch plates 44 increases gradually, which substantially suppresses the impact that occurs when the clutch drum 41 and the spline shaft 42 start rotating together, thereby reducing noise. In addition, because the frictional force is changed in response to the pressing force of the bit 10 against the screw, the user can easily control the rotation of the bit 10 by adjusting the pressing force.

When the bit 10 is separated from the screw after screw driving is done, the urging force of the spring 46 causes the spline shaft 42 and the socket 51 to move forward. This movement terminates the contact between the contact section 51A and the second clutch plate 44, which reduces the friction between the first clutch plates 43 and the second clutch plates 44, thereby suppressing the transmission of the output from the motor 3 to the socket 51.

In order to pull out a screw (not shown) from a workpiece (not shown) when the screw is driven into a wrong position, the user turns the switch 21D to the reverse side to rotate the motor 3 in the reverse direction, and then, engages the tip end of the end bit 10 with the groove of the head of the screw, and then pulls the trigger 21A. If the head of the screw protrudes from the surface of the workpiece, the reaction force acting on the bit 10 from the screw causes the end bit mounting portion 5 to move rearward, so that the contact section 51A becomes brought into contact with the foremost second clutch plate 44. Thus, friction between the first clutch plates 43 and the second clutch plates 44 occurs. Consequently, the driving force in the reverse direction is transmitted to the bit 10, allowing the screw to be pulled out efficiently.

However, if the head of the screw does not protrude from the surface of the workpiece (i.e., if the screw is buried in the workpiece), the cover 54 prevents the bit 10 from contacting the screw with sufficient force. Even if the bit 10 contacts the screw, the bit 10 cannot receive sufficient reaction force from the screw, and the end bit mounting portion 5 remains its frontward position. As a result, sufficient frictional force may not be generated between the first clutch plates 43 and the second clutch plates 44. In this case, the driving force cannot be transmitted from the clutch drum 41 to the spline shaft 42 via the first clutch plates 43 and the second clutch plates 44. However, because the driving force is in the reverse direction, the driving force can be transmitted from the clutch drum 41 to the spline shaft 42 via the one-way clutch 45.

Figure 13:
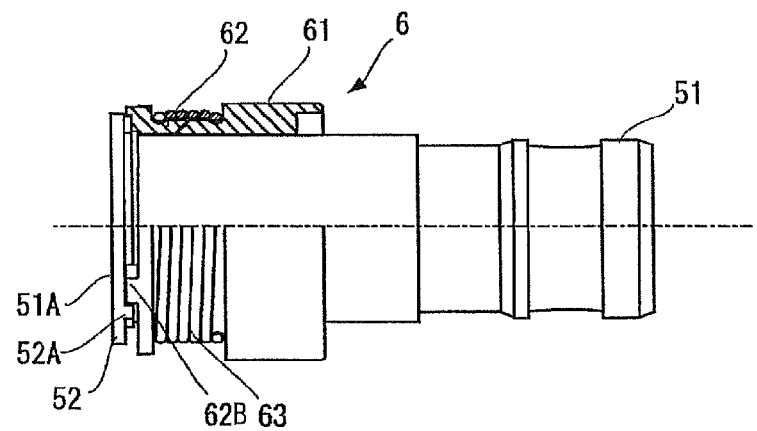
FIG. 13 a cross-sectional view of the spring clutch mechanism and the socket portion under non-application of load in the screw driver according to the embodiment.

If sufficient reaction force is not applied to the bit 10, the socket 51 does not move rearward as shown in FIG. 13. Therefore, the engaged section 62B is engaged with the engagement pawls 52A, so that the socket 51 and the seat section 62 become integrally rotatable. In this case, since the seat portion 62 can be reversely rotated with respect to the bearing section 61 because of the winding direction of the spring section 63, the spring clutch mechanism 6 does not prevent the socket 51 from its reverse rotation. Accordingly, the screw can be separated from the workpiece upon reverse rotation of the motor 3 even if sufficient reaction force from the screw is not imparted to the bit 10.

Further, if the trigger 21A is pulled in a state where no reaction force is imparted on the bit 10, for example, nothing is in contact with the bit 10, friction force between the first and second clutch plates 43 and 44 is not theoretically generated, since the end bit mounting portion 5 may maintain its frontward position. However, there may be a probability that the first and second clutch plates 43 and 44 contact with each other, and the switch 21D is not switched to the reverse rotation side, but is maintained at the forward rotation side. Still however, in case where the reaction force is not applied to the end bit 10, the engagement pawls 52A are engaged with the engaged section 62B to allow the end bit mounting portion 5 and the seat section 62 to rotate integrally, and the forward rotation of the seat section 62 relative to the bearing section 61 is prevented. Therefore, co-rotation of the socket 51 and the clutch portion 4 in the forward direction can be restrained. Thus, the free end of the end bit can be easily engaged with the groove of the head of the screw.

Figure 14:
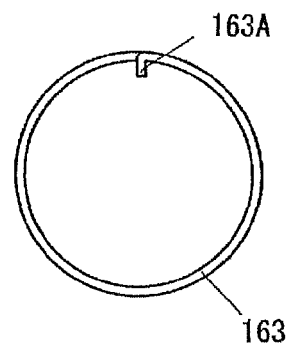
FIG. 14 is a front view of a spring in a screw driver used in a screw driver according to a first modification.
Figure 15:
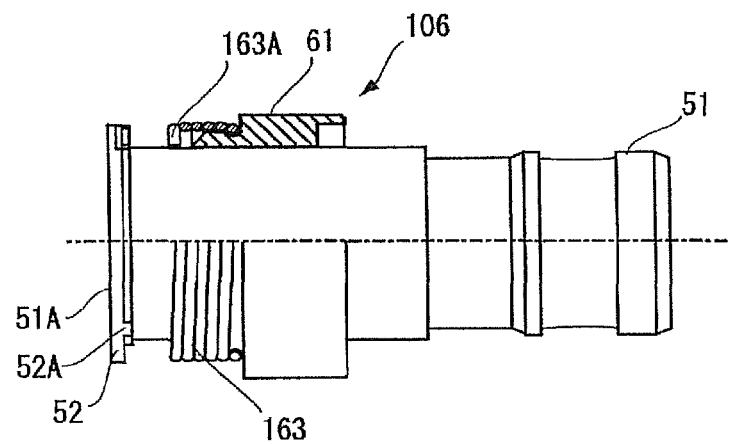
FIG. 15 is a cross-sectional side view of a spring clutch mechanism in the screw driver according to the first modification.

FIGS. 14 and 15 show a modification to the spring clutch mechanism 6. According to the modification, a rear end portion of a spring section 163 is bent to provide an engagement portion 163A engageable with the engagement pawl 52A.

Figure 16:
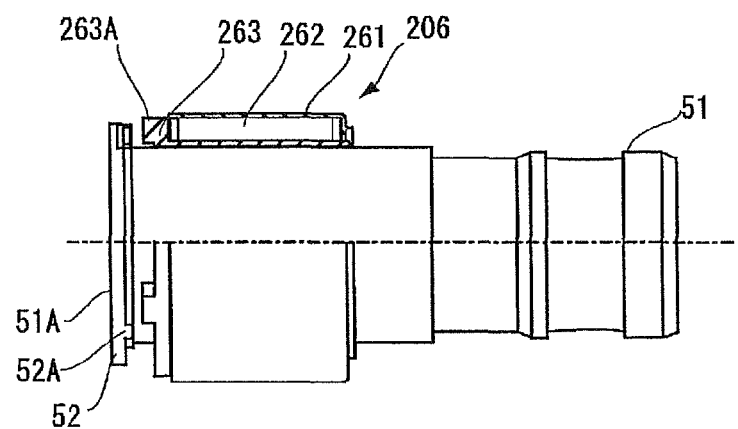
FIG. 16 is a partial cross-sectional side view of a spring clutch mechanism in a screw driver according to a second modification.

FIG. 16 shows another modification in which a conventional one-way bearing 206 is employed instead of the spring clutch mechanism 6. The one-way bearing 206 includes an outer race 261, an inner race 262 and a sleeve 263. The outer race 261 is fixed to the housing 2 and allows the inner race 262 to exclusively rotate in the forward direction. The sleeve 263 is fixed to the inner race 262 and has an inner cylindrical surface slidably supporting the socket 51. The sleeve 263 has a rear end portion provided with an engaged part 263A engageable with the engagement pawl 52A. If the socket 51 is moved rearward, the engagement pawl 52A disengages from the engaged part 263A. With the arrangements shown in FIGS. 14 through 16, co-rotation of the socket 51 can be prevented at non-loading state of the bit 10.

Further, in the foregoing embodiment, the frusto-conical surface is at the bearing section 61, and the complementary tapered surface 62C is at the seat section 62. However, the frusto-conical surface can be provided at the seat section 62, and the tapered surface 62C can be provided at the bearing section 61.

While the invention has been described in detail with reference to the embodiments thereof, it would be apparent to those skilled in the art that various changes and modifications may be made therein without departing from the spirit of the invention.

What is claimed is:

1. A clutch mechanism for transmitting a driving force of a motor to an end-bit mounting portion which includes a socket and an engagement segment, comprising:
    a first clutch portion having driving members and driven members, the driving members being rotatable with the motor and the driven members being rotatable with the end-bit mounting portion,
    a second spring clutch including;
        a first part having a sleeve section fixed to a housing, a first spring mount section and an abutment section having a first tapered surface,
        a second part having a second spring mount section and an engaged section, the second spring mount section having a second tapered surface, the first part and the second part being aligned linearly and coaxially in a state that the first tapered surface is in contact with the second tapered surface, and
        a spring disposed between the first spring mount section and the second spring mount section for allowing the second part to rotate only in one direction with respect to the first part,
    wherein the driving force can be transmitted to the socket by way of the first clutch portion when the engagement segment is disengaged from the engaged section and co-rotation of the socket and the first clutch portion in a forward direction can be restrained when the engagement segment is engaged with the engaged section.

2. The clutch mechanism as claimed in claim 1, wherein the first part and the second part are made from a metal.

3. The clutch mechanism as claimed in claim 1, wherein the spring is a coil spring having one end and another end; and
    wherein the first spring mount section is formed with a first seat groove in which the one end of the coil spring is seated; and
    wherein the second spring mount section is formed with a second seat groove in which the another end of the coil spring is seated.

4. The clutch mechanism as claimed in claim 3, wherein the first seat groove is a first annular groove formed at an outer peripheral surface of the first spring mount section, and
    wherein the second seat groove is a second annular groove formed at an outer peripheral surface of the second spring mount section.

5. The clutch mechanism as claimed in claim 3, wherein the coil spring is made from steel.

* * * * *